US008243629B2

(12) United States Patent
Stephen et al.

(10) Patent No.: US 8,243,629 B2
(45) Date of Patent: Aug. 14, 2012

(54) METHODS AND APPARATUS FOR SELECTING BETWEEN AN AD-HOC CONFERENCE MODE AND AN INFRASTRUCTURE SUPPORTED CONFERENCE MODE (75) Inventors: Patrick Stephen, South Elgin, IL (US);
Greg Dykes, Flower Mound, TX (US);
Richard Joyner, Palatine, IL (US);
Yi-Cheng Liu, Barrington, IL (US);
Edgardo Promenzio, Round Lake, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 420 days.

(21) Appl. No.: 12/506,697

(22) Filed: Jul. 21, 2009

(65) Prior Publication Data
US 2011/0019593 A1      Jan. 27, 2011

(51) Int. Cl.
*H04L 12/16* (2006.01)

(52) U.S. Cl. ............... 370/260; 379/158; 379/202.01; 455/216; 709/204

(58) Field of Classification Search .................. None
See application file for complete search history.

(56) References Cited

U.S. PATENT DOCUMENTS

| | | | |
|---|---|---|---|
| 6,577,622 B1 | 6/2003 | Schuster et al. | |
| 6,785,246 B2 | 8/2004 | Foti | |
| 7,151,753 B2 | 12/2006 | Chaney et al. | |
| 2005/0213511 A1* | 9/2005 | Reece et al. | 370/252 |
| 2007/0165810 A1* | 7/2007 | Nguyen et al. | 379/158 |
| 2009/0129296 A1* | 5/2009 | Grinshpun et al. | 370/261 |
| 2009/0210536 A1* | 8/2009 | Allen et al. | 709/227 |
| 2009/0286544 A1* | 11/2009 | Huber et al. | 455/450 |
| 2010/0165889 A1* | 7/2010 | Madabhushi et al. | 370/261 |

FOREIGN PATENT DOCUMENTS

| | | |
|---|---|---|
| EP | 1901528 A1 | 3/2008 |
| WO | 2006023484 A1 | 3/2006 |

OTHER PUBLICATIONS

International Search Report and Written Opinion for International Application No. PCT/US2010/040133 mailed on Oct. 14, 2010.

(Continued)

*Primary Examiner* — Ayaz Sheikh
*Assistant Examiner* — Nicholas Sloms (57) ABSTRACT

Devices that are enabled to communicate with each other via an ad hoc conference mode and an infrastructure supported conference mode, are provided with processing capabilities that can allow them to evaluate one or more resources required to support an ad hoc conference communication session and/or one or more quality metrics associated with the ad hoc conference communication session, and determine whether one or more resources or metrics are outside optimal operating parameters. If so, the processing logic can initiate a transition from the ad hoc conference communication session to an infrastructure supported conference communication session hosted at a conference server. This way, the devices can drop the ad hoc conference communication session when one or more of the resources or metrics are outside optimal operating parameters, so that one of the devices does not need to mix communication information streams (CISs) from the devices, generate a plurality of conferenced communication information streams (CCISs), and transmit a unique one of the conferenced communication information streams (CCISs) to the other devices.

6 Claims, 5 Drawing Sheets

OTHER PUBLICATIONS

Camarillo, G., et al., "Ad-Hoc Conferencing in the Session Initiation Protocol (SIP) draft-camarillo-sipping-adhocconferencing-00.txt," MCI SIPPING Working Group, Mar. 27, 2004, pp. 9, accessed at http://tools.ietf.org/html/draft-camarillo-sipping-adhoc-conferencing-00.

Johnston, A., et al., "Session Initiation Protocol (SIP) Call Control—Conferencing for User Agents," RFC4579, Microsoft Corporation Network Working Group, Aug. 2006, pp. 44.

Rosenberg., "SIP Call Control Services," Internet Engineering Task Force, Jun. 17, 1999, pp. 34, accessed at http://tools.ietf.org/html/draft-ietf-mmusic-sip-cc-01.

Rosenberg, J, "A Framework for Conferencing with the Session Initiation Protocol (SIP)," RFC4353, Cisco Systems Network Working Group, Feb. 2006, pp. 30.

International Preliminary Report on Patentability and Written Opinion for counterpart International Application No. PCT/US2010/040133 issued on Jan. 24, 2012.

* cited by examiner

METHODS AND APPARATUS FOR SELECTING BETWEEN AN AD-HOC CONFERENCE MODE AND AN INFRASTRUCTURE SUPPORTED CONFERENCE MODE

TECHNICAL FIELD

The present invention generally relates to telecommunications, and more particularly to conference communication systems.

BACKGROUND

A conference communication session refers to communication session between three or more participants that allows each participant to communicate simultaneously with multiple parties, which may also communicate among themselves. In a conference communication session each of the participants can communicate information including audio information, data and/or video information, or a combination thereof, with each of the other participants via a conference access device (CAD), such as wired or wireless communication device. For instance, one common type of conference communication session is a telephone call in which more than two participants participate in the audio portion of the call.

In a conference communication session, each participant can generate a stream of communication information (e.g., audio, data, video information) at their device that is to be communicated to other participants. For instance, if there are four participants $P_1$, $P_2$, $P_3$, $P_4$ in a conference communication session, then a device of participant $P_1$ can generate communication information stream ($CIS_1$), a device of participant $P_2$ can generate communication information stream ($CIS_2$), a device of participant $P_3$ can generate communication information stream ($CIS_3$), and a device of participant $P_4$ can generate communication information stream ($CIS_4$). Each CIS can include audio, data and/or video information. In this example, an entity that serves as the conference bridge for the conference communication session will mix the various CISs to generate a plurality of unique conferenced communication information streams (CCISs), and then communicates one of the unique CCISs to the device of each participant. As used herein, the term "conferenced communication information stream (CCIS)" refers to a communication stream transmitted to a participant's device that combines communication data generated by other devices participating in a communication session. The entity that performs the mixing must mix a number of CCISs equal to the number of participants and separately transmit a CCIS to each participant's device sot that each participant receives CISs from each of the other participants, but not their own CIS. For example, in the particular example provided above the entity will combine $CIS_2$, $CIS_3$, and $CIS_4$ into a first $CCIS_1$ and transmit the first $CCIS_1$ to the device of participant $P_1$. Likewise, the entity will combine $CIS_1$, $CIS_3$, and $CIS_4$ into a second $CCIS_2$ and transmit the second $CCIS_2$ to the device of participant $P_2$. will combine $CIS_1$, $CIS_2$, and $CIS_4$ into a third $CCIS_3$ and transmit the third $CCIS_3$ to the device of participant $P_3$, and will combine $CIS_1$, $CIS_2$, and $CIS_3$ into a fourth $CCIS_4$ and transmit the fourth $CCIS_4$ to the device of participant $P_4$. This way, each participant receives communication information streams (CISs) from all other participants, but does not receive their own CIS.

As will be described below, the entity that performs this mixing of CISs and that generates the various CCISs, can be either a centralized conference server in a "meet-me" conference communication session, or one of the devices that is actually participating in the conference communication session in an ad hoc conference communication session A meet-me conference communication session allows the participants to call into and join the conference communication session themselves. In a meet-me conference communication session each participant is provided with a single common telephone number, bridge identifier and password (e.g., PIN code) prior to the start of the call. To access the conference communication session, participants call the common telephone number which has been assigned to a "conference bridge" that is instantiated at a "meet-me" conference server, and then enter a bridge identifier and password to connect their telephone to that "conference bridge." The conference bridge then conferences or links multiple communications paths of multiple CADs together to allow simultaneous communications between the participants. In a meet me conference communication session, the conference server mixes the CISs and generates the various CCISs.

By contrast, an ad hoc conference communication session is designed so that a calling party calls the other participants and adds them to the conference communication session. In other words, the conference communication session is built by a single end-user by manually adding other conference participants to the session one-at-a-time. For example, a conventional three-way call is an ad-hoc conference as two people are conversing and then one of the two decides to add a third party manually. However, it should be appreciated that an ad-hoc conference communication session is not limited to three participants.

In a conventional ad hoc conference communication session it is common for one of the devices that is participating in the call to locally mix the CISs of the various participants in the communication session, and then retransmit a unique CCIS to each of the devices of the other participants. This requires the transmitting device to transmit multiple communication streams. "Locally" mixing the CISs at one of the devices places increased demands on the mixing device's hardware and can significantly reduce battery life. Moreover, transmitting multiple CCISs to each of the other devices of the other participants in the conference also consumes significant resources especially when the CCISs are transmitted wirelessly since this consumes significant "over-the-air" or radio resources. Under these circumstances, it would be desirable to transition from an ad hoc conference communication session to an infrastructure supported conference communication session so that mixing and replication of CISs and transmission of CCISs can be performed at a "meet-me" conference server.

Accordingly, it is desirable to provide improved systems and methods for automatically determining when to transition from an ad hoc conference communication session to an infrastructure supported conference communication session so that mixing and replication of CISs and subsequent transmission of the CCISs are performed at a conference server. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to selecting between an ad hoc conference communication session mode and an infrastructure supported conference communication session mode. Prior to describing the disclosed embodiments a brief overview will be provided followed by a description of a conventional ad hoc conference communication session with reference to FIGS. 1A and 1B, followed by a description of a conventional infrastructure supported conference communication session with reference to FIG. 2 and an exemplary wireless computing device with reference to FIG. 3.

Overview

Embodiments of the present invention relate to a system and method for selecting between an ad hoc conference mode and an infrastructure supported conference mode. In one embodiment, a system is provided that includes a first device of a first participant, and a second device of a second participant that is participating in a communication session with the first device. One of the devices then decides to add a third device of a third participant to the communication session to establish an ad hoc conference communication session between the first, second and third participants. The first device, second device and third device each comprise a processor. Each processor is designed to evaluate one or more resources required to support the ad hoc conference communication session and/or one or more quality metrics associated with the ad hoc conference communication session, and to determine whether one or more resources and/or metrics are outside optimal operating parameters.

Non-limiting examples of resources being utilized to support the ad hoc conference communication session can include one or more of: (a) remaining battery power of the device, (b) a percentage of local CPU resources and local memory resources of the device that are presently being utilized, (c) resources required to perform local mixing of communication information streams (CISs) generated by the devices and to generate a plurality of conferenced communication information stream (CCISs), (d) a percentage of available access point (AP) bandwidth for the access point (AP) that the device is presently communicating through, (e) a number of infrastructure ports being utilized to support the communication session, etc.

When the resources and/or metrics are within optimal operating parameters, the ad hoc conference communication session continues. During the ad hoc conference communication session, one of devices (e.g., either the first device or the second device that initiated the ad hoc conference communication session) mixes communication information stream (CISs) from the first device, the second device, and the third device to generate a plurality of conferenced communication information streams (CCISs). This device then transmits a unique one of the conferenced communication information streams (CCISs) to each of the other devices.

However, when one or more of the resources and/or metrics are outside optimal operating parameters, the processor initiates a transition from the ad hoc conference communication session to an infrastructure supported conference communication session. The first, second and third devices end the ad hoc conference communication session and begin the infrastructure supported conference communication session that is hosted at a conference server designed to communicate with the first, second and third devices. Once the infrastructure supported conference communication session begins, the conference server mixes the communication information streams (CISs) from the first device, the second device, and the third device to generate a plurality of conferenced communication information stream (CCISs), and then communicate a unique one of the conferenced communication information streams (CCISs) to each of the first device, the second device, and the third device. As such, during the infrastructure supported conference communication session, the first, second and third devices indirectly communicate with one another via the conference server.

Figure 1A:
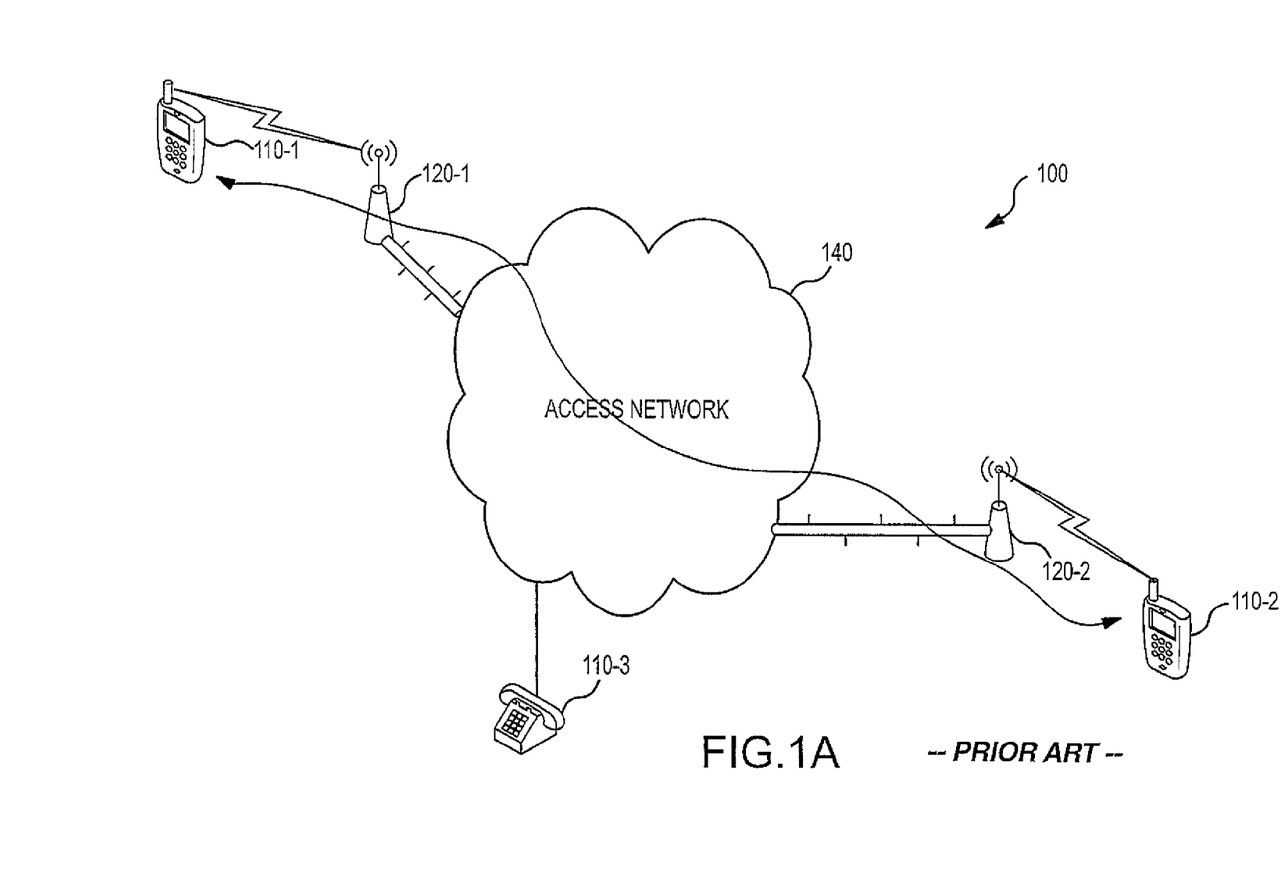
FIGS. 1A and 1B are simplified block diagrams which illustrate an exemplary network capable of supporting a conventional ad hoc conference communication session between wireless computing devices and a telephone.
Figure 1B:
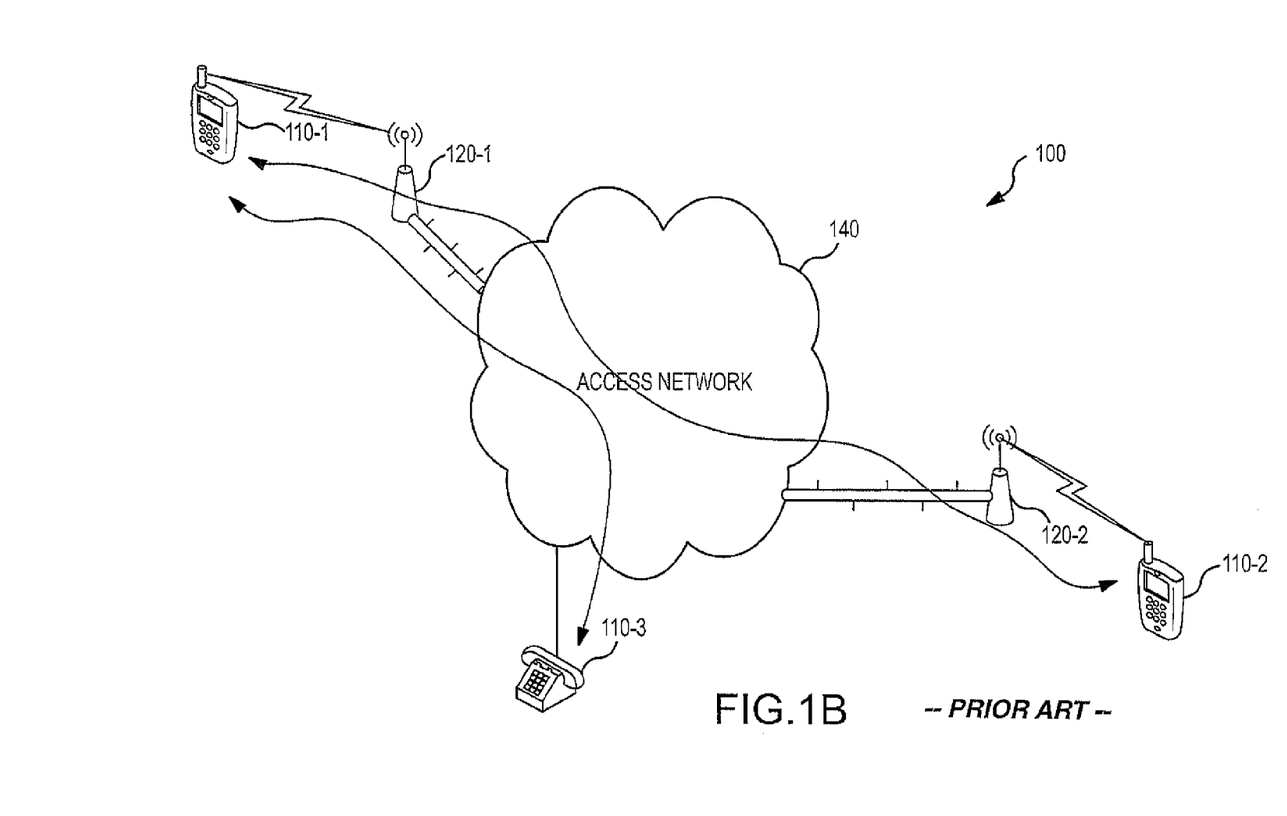

Each time a new device of another participant is added to the ad hoc conference communication session, the processors of the first device, second device and third device are further designed to determine, based on the resources required to support the ad hoc conference communication session and/or the quality metrics associated with the ad hoc conference communication session, whether one or more resources and/or metrics are outside optimal operating parameters, and if so, will initiate a transition from the ad hoc conference communication session to an infrastructure supported conference communication session hosted at the conference server Exemplary Conference Communication Sessions FIGS. 1A and 1B are simplified block diagrams which illustrate an exemplary network 100 capable of supporting a conventional ad hoc conference communication session between wireless computing devices 110-1, 110-2 and a telephone 110-3. Network 100 is one non-limiting example network configuration that illustrated solely for the purpose of explaining the concept of a conventional ad hoc conference communication session. A conventional ad hoc conference communication session can include any number of conference access devices (CADs) 110 that allows for communication of information and can be conducted among any combination of wireless communication devices and wired communication devices; there is no limitation on the types of CADs or the number of CADs that can be utilized.

In this particular example, the network 100 includes an access network (AN) 140, access points 120-1, 120-2, wireless computing devices 110-1, 110-2, and a telephone 110-3 coupled to the AN 140. The AN 140 can include any number of conventional network devices including, but not limited to radio access networking components, core networking components, switches, routers, gateways, private branch exchanges (PBXs), etc. The access points 120-1, 120-2 are coupled to the AN 140 and allow wireless computing devices 110-1, 110-2 to communicate over the AN 140 with any other devices that are coupled to the AN 140, including telephone 110-3.

As used herein, the term "wireless computing device" refers to any portable computer or other hardware designed to communicate with an infrastructure device (such as APs 120) over an air interface through a wireless channel. In many cases such wireless computing devices are "handheld" and potentially mobile or "nomadic" meaning that the wireless computing devices 110-1, 110-2 can physically move around a WLAN, but at any given time may be mobile or stationary and can include devices that communicate through a wireless channel. The wireless computing devices 110-1, 110-2 can be one of any of a number of types of mobile computing devices, which include without limitation, mobile stations (e.g. mobile telephone handsets, mobile radios, mobile computers, hand-held or laptop devices and personal computers, a PC card, personal digital assistants (PDAs), or the like), access terminals, subscriber stations, user equipment, compact flash, external or internal modem, or any other devices configured to communicate via wireless communications. Although not illustrated, each AP 120 can serve multiple wireless client devices within a defined network area. It will be appreciated by those skilled in the art that although FIG. 1 shows an exemplary network configuration in which two wireless computing devices 110-1, 110-2 are present, in many cases many wireless computing devices can be configured as part of the network 100 at any given time. The wireless computing devices 110-1, 110-2 can communicate with the APs 120 in accordance with any known wireless communication standards such as those based on a know telecommunication standards (e.g., $3^{rd}$ Generation Partnership Project (3GPP), $3^{rd}$ Generation Partnership Project 2 (3GPP2), Global System for Mobile communication (GSM), Code Division Multiple Access (CDMA), Wide-band CDMA (WCDMA), Universal Mobile Telecommunications System (UMTS), LTE and the like) and those based on ad hoc networking standards (e.g., IEEE 802.11, IEEE 802.16, Worldwide Interoperability for Microwave Access (WiMax), and the like).

The access points 120-1, 120-2 are devices that enable the wireless computing device 110-1, 110-2 to connect to and communicate with a wireless local area network (WLAN) that can be part of or separate from AN 140. The access points 120-1, 120-2, can relay data between the wireless computing devices 110-1, 110-2 and wired devices on the WLAN and/or on other parts of the AN 140, such as telephone 110-3. The AP directly serves as the point of interconnection between the WLAN and the fixed wired network and allows wireless communication devices to be quickly and easily connected to a wired LAN. In general, an access point is a network-capable device containing a transceiver and antenna for transmitting signals to and receiving signals from the remote client devices or stations. The wireless protocol terminates at the access point. In the embodiment illustrated in FIG. 1, the access points 120 are illustrated as being coupled to AN 140, but in other network architectures other intermediate switches, routers and other network devices can be present between the APs 120 and the AN 140.

As illustrated in FIG. 1A, WCD 110-1 initiated and is in a communication session with another WCD 110-2. As illustrated in FIG. 1B, WCD 110-1 then seeks to add the telephone 110-3 to an ad-hoc conference communication session. In an ad hoc conference communication session such as this, the CCISs (i.e., the mixed CISs of each participant in the conference communication session) that are exchanged in the communication session are mixed locally on the WCD 110-1 that initiated the conference communication session. As illustrated in FIG. 1B, the WCD 110-1 then transmits a unique CCIS to each of the CADs 110-2, 100-3 of the other participants. As explained above, mixing is performed to generate CCISs such that a CCIS is generated for each participant so that each participant receives a CCIS that includes CISs from all other participants, but does not include their own CIS. In other words, the communication information that is eventually heard by the participants is actually replicated by the WCD 110-1 and transmitted to the CADs 110-2, 110-3 of the other participants in the conference via multiple CCISs (i.e., one to each CAD 110-2, 110-3 of the other participants).

Figure 2:
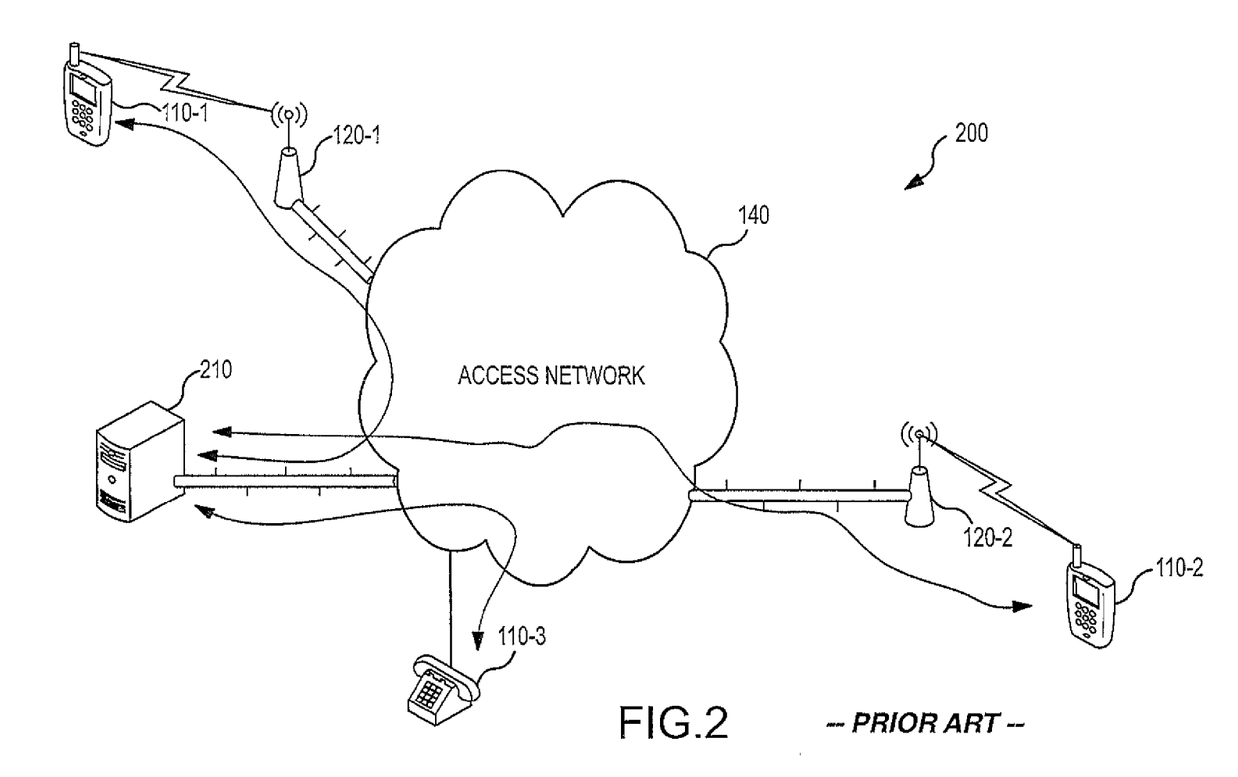
FIG. 2 is a simplified block diagram which illustrates an exemplary network capable of supporting a conventional infrastructure supported conference communication session between wireless computing devices and a telephone.

FIG. 2 is a simplified block diagram which illustrates an exemplary network 200 capable of supporting a conventional infrastructure supported conference communication session between wireless computing devices 110-1, 110-2 and a telephone 110-3. This type of infrastructure supported conference communication session is sometimes referred to as a "meet-me" type conference communication session. The network 200 is similar to that illustrated in FIG. 1 but also includes a conference server 210 that performs mixing the CISs received from the CADs 110-1, 110-2, 100-3 of the participants to produce a plurality of CCISs, and then communicates one of the CCISs to the CADs 110-1, 110-2, 100-3 of each of the participants.

In an ad-hoc conference communication session such as that describe above with reference to FIGS. 1A and 1B, "locally" mixing the CISs at the WCD 110-1 places increased demands on the it's hardware. For instance, the communication information must be mixed, and then prepared for transmission to the other participants. As the number of participants increases, the hardware demands become even more pronounced because there more CISs to mix, each CCIS represents a different combination of CISs. Moreover, wirelessly transmitting multiple CCISs to the CADs 110-2, 110-3 of the other participants in the conference consumes significant radio resources. This can significantly reduce battery life of the CAD that is performing the extra processing and communication tasks to communicate the CCISs. In such scenarios, it would be desirable to provide methods and apparatus which can allow for the wireless computing devices 110-1, 110-2 and the telephone 110-3 to intelligently select between an ad-hoc conference mode to an infrastructure supported conference mode. When the infrastructure supported conference mode transition is selected it would be desirable to automatically transition to supporting the conference at a conference server 210 that performs mixing of the CISs from each of the participants and that then communicates the CCISs to the CADs 110-1, 110-2, 100-3 of each of the participants.

Prior to describing the disclosed embodiments in detail, some of the components of an exemplary wireless computing device that are used in conjunction with the method of FIG. 4 will now be described with reference to FIG. 3.

Figure 3:
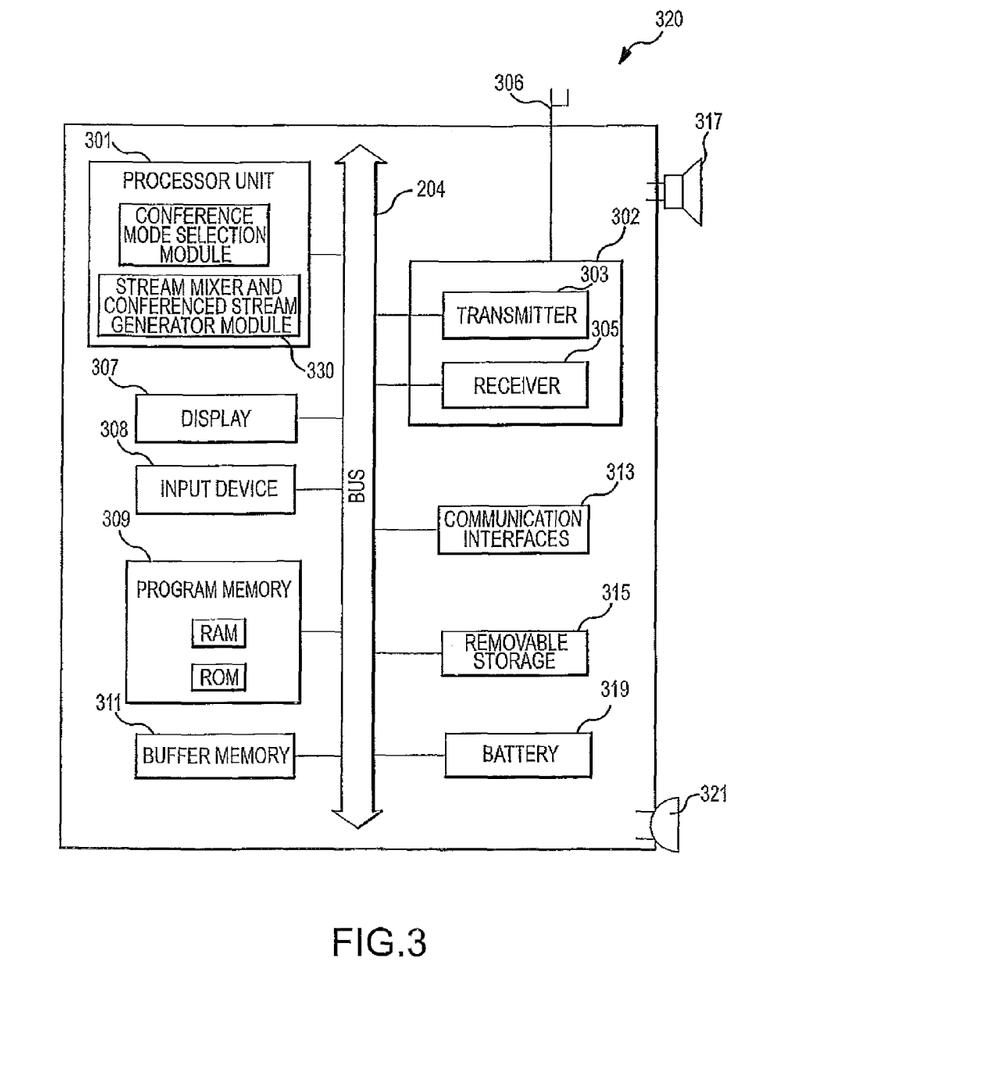
FIG. 3 is a block diagram of an exemplary wireless computing device.

FIG. 3 is a block diagram of an exemplary wireless computing device 110. The wireless computing device 110 comprises a processor 301, a transceiver 302 including a transmitter circuitry 303 and a receiver circuitry 305, an antenna 306, a display 307, input devices 308 (microphones, keyboards, touch screens, etc.), a program memory 309 for storing operating instructions that are executed by the processor 301, a buffer memory 311, one or more communication interfaces 313, and a removable storage unit 315, a speaker 317, a battery 319 and a microphone 321. Although not shown, the wireless computing device 110 also can include a power source in addition to the battery 319, and an antenna switch, duplexer, circulator, or other highly isolative means (not shown) for intermittently providing information packets from the transmitter circuitry 303 to the antenna 306 and from the antenna 306 to the receiver circuitry 305. The wireless computing device 110 can be an integrated unit containing at least all the elements depicted in FIG. 3, as well as any other elements necessary for the wireless computing device 110 to perform its particular functions. Alternatively, the wireless computing device 110 may comprise a collection of appropriately interconnected units or devices, wherein such units or devices perform functions that are equivalent to the functions performed by the elements of the wireless computing device 110.

The processor 301 can include one or more microprocessors, microcontrollers, DSPs (digital signal processors), state machines, logic circuitry, or any other device or devices that process information based on operational or programming instructions. Such operational or programming instructions can be, for example, stored in the program memory 309. As will be described in greater detail below, the processor 301 can include a conferencing mode selection module 320 that is used to perform processing associated with a conferencing mode selection method 400. The processor 301 can also include a stream mixer and conferenced stream generator module 330 for mixing multiple CISs from different users together into the different CCISs that can then be transmitted to each of the other conference participants.

The program memory 309 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information.

One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the wireless computing device 110 are described in detail below.

The transmitter circuitry 303 and the receiver circuitry 305 enable the wireless computing device 110 to communicate information packets to and acquire information packets from the other nodes. In this regard, the transmitter circuitry 303 and the receiver circuitry 305 include conventional circuitry to enable digital or analog transmissions over a wireless communication channel. The transmitter circuitry 303 and the receiver circuitry 305 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., IEEE 802.11 WLAN interfaces, IEEE 802.16 interfaces, Worldwide Interoperability for Microwave Access (WiMax) interfaces, and the like).

The implementations of the transmitter circuitry 303 and the receiver circuitry 305 depend on the implementation of the wireless computing device 110. For example, the transmitter circuitry 303 and the receiver circuitry 305 can be implemented as an appropriate wireless modem, or as conventional transmitting and receiving components of two-way wireless communication devices. In the event that the transmitter circuitry 303 and the receiver circuitry 305 are implemented as a wireless modem, the modem can be internal to the wireless computing device 110 or insertable into the wireless computing device 110 (e.g., embodied in a wireless radio frequency (RF) modem implemented on a Personal Computer Memory Card International Association (PCMCIA) card). For a wireless communication device, the transmitter circuitry 303 and the receiver circuitry 305 can be implemented as part of the wireless device hardware and software architecture in accordance with known techniques. Most, if not all, of the functions of the transmitter circuitry 303 and/or the receiver circuitry 305 may be implemented in a processor, such as the processor 301. However, the processor 301, the transmitter circuitry 303, and the receiver circuitry 305 have been artificially partitioned herein to facilitate a better understanding.

The receiver circuitry 305 is capable of receiving radio frequency (RF) signals from at least one bandwidth and optionally multiple bandwidths, if the communications with the proximate device are in a frequency band other than that of the network communications. The receiver circuitry 305 may optionally comprise a first receiver and a second receiver, or one receiver capable of receiving in two or more bandwidths. The transceiver 302 includes at least one set of transmitter circuitry 303. The at least one transmitter 303 may be capable of transmitting to multiple devices on multiple frequency bands. As with the receiver 305, dual transmitters 303 may optionally be employed where one transmitter is for the transmission to a proximate node or direct link establishment to WLANs and the other transmitter is for transmission to a cellular base station, for example.

The antenna 306 comprises any known or developed structure for radiating and receiving electromagnetic energy in the frequency range containing the wireless carrier frequencies.

The buffer memory 311 may be any form of volatile memory, such as RAM, and is used for temporarily storing received information packets in accordance with the present invention.

When the wireless computing device 110 is constructed to receive video information from a video source, the wireless computing device 110 further can include a video decoder capable of decoding the current Moving Picture Experts Group (MPEG) standard or some other video decoding standard. When the wireless computing device 110 is further capable of transmitting video information, the wireless computing device 110 further can include a video encoder capable of encoding the video data into at least one of the foregoing video standards. Such video encoder and decoder can be, for example, implemented as part of the processor 301.

Figure 4:
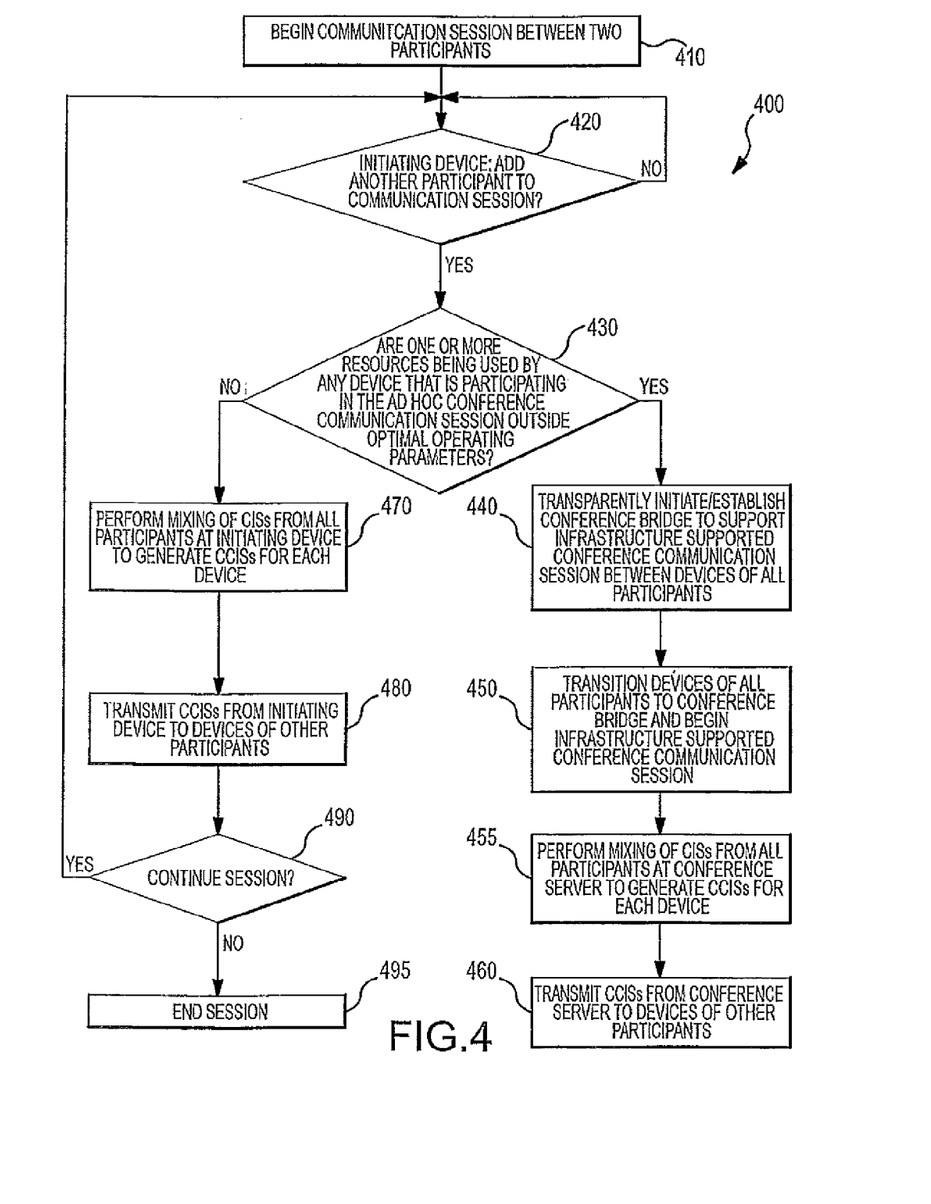
FIG. 4 is a flowchart illustrating a conferencing mode selection method for selecting a conferencing mode in accordance with some embodiments of the present invention.

FIG. 4 is a flowchart illustrating a conferencing mode selection method 400 for selecting a conferencing mode in accordance with some embodiments of the present invention. Steps 410 through 440 and 470 through 495 are performed at wireless computing device to select or determine a conferencing mode, whereas steps 450 through 460 are performed at a conference server 210 to when a decision is made to switch to infrastructure supported conference mode.

Method 400 begins at step 410, when a communication session is initiated between a first device 110-1 of a first participant and a second device 110-2 of a second participant. Either participant can initiate the communication session. The communication session involves the exchange of communication information streams (CISs), such as voice, data and/or video streams, between the participants.

At step 420, an initiating participant who is using an "initiating" device 110-1, 110-2 decides to add a third device 110-3 of a third participant to the communication session and thereby establish an ad hoc conference communication session between the first, second and third participants. Here, the initiating participant can be either the first participant or the second participant that decides to add the third device 110-3 of the third participant to the communication session. In the description that follows, it will be assumed that the initiating participant is the first participant that is using the first device 110-1.

At step 430, any of the devices participating in the communication session can automatically determine whether one or more metrics associated with that device are outside/within optimal operating parameters, and/or whether one or more resources being utilized by that device to support the ad hoc communication session are outside/within optimal operating parameters. The optimal operating parameters depend on the specific implementation and the values that are acceptable for those optimal operating parameters can also vary depending on the specific implementation.

In some implementations, the devices 110-1 . . . 100-3 can automatically determine whether one or more resources being utilized to support the ad hoc communication session are above/below a threshold. In such implementations, the resources can be one or more "local" resources of the devices 110-1 . . . 110-3. For instance, one the resources that are evaluated can be the remaining battery power of the device 110-1 . . . 110-3, and therefore the device 110-1 . . . 110-3 can determine if their remaining battery power is above a remaining battery life threshold. In addition (or in the alternative), another one the resources that the initiating device 110-1 evaluates can be the resources of the initiating device 110-1 required to perform local mixing of communication information streams (CISs) generated by the devices that are participating in the ad hoc conference communication session. For instance, in one implementation, the initiating device 110-1 evaluates its local CPU and/or local memory resources that are being used to perform local mixing of communication information stream (CISs) (generated by the various devices that are participating in the ad hoc conference communication session). The initiating device 110-1 compares its local CPU and/or local memory resources to a percentage threshold (or percentage thresholds) to determine if such usage exceeds threshold for usage(s) of those CPU and/or memory resources.

In another implementation, the resources can be one or more other communication resources being utilized by any one of the devices 110-1 . . . 110-3 to support its ad hoc conference communication session with the other devices. For example, the devices 110-1 . . . 110-3 can automatically determine whether a percentage of available access point (AP) bandwidth (for the access point (AP) that the device is presently communicating through) that is being utilized to support the ad hoc communication session are above a threshold. In addition (or in the alternative), the devices 110-1 . . . 110-3 can automatically determine whether the load on the AP that the device is presently communicating through during the ad hoc communication session exceeds a threshold (e.g., whether the number of AP ports being used to support the ad hoc communication session exceeds a threshold number of AP ports).

In addition (or in the alternative), the devices 110-1 . . . 110-3 can determine whether one or more other quality metrics exceed a threshold. For instance, in one implementation, the devices 110-1 . . . 110-3 can automatically determine whether the packet drop rate exceeds a threshold packet drop rate, and/or whether the jitter or "packet delay variation (PDV)" (i.e., a measure of the variability over time of the packet latency) exceeds a jitter threshold. In general other metrics can be used that include channel quality measurements and channel quality statistics. Channel quality measurements can include, for example, QoS metrics, a transmitted power level (TPL) (in Decibels (Dbm)) at which the respective data packets were transmitted by the transmitting node over the respective links (e.g., the power level at which the node finds it necessary to transmit a data-packet over the link), received signal strength indicator (RSSI) value provided for each respective link, a received sensitivity (RS) value of the receiving node receiving the data packets, and any other metrics that can be used to determine channel or link quality. Examples of channel quality statistics can include bit-error rate (BER) estimates, post-detection signal quality (PDSQ) values, and analog gain control (AGC) output.

In still another implementation, the resources and/or metrics that are evaluated can be any combination of the resources and/or metrics describe above.

When any of the devices participating in the conference communication session determines that one or more resources being utilized are outside optimal operating parameters (and/or that one or more metrics associated with that device are outside optimal operating parameters), the method 400 proceeds to step 440, where that device automatically initiates a transparent transition from the ad hoc conference communication session to an infrastructure supported conference communication session hosted at a conference server 210. In one implementation, the participant that wants to transition to the infrastructure supported conference communication session, forwards a Session Initiation Protocol (SIP) invite request towards a Serving-Call Session Control Function (S-CSCF) implemented at the conference server 140. The S-CSCF acts as the conference-factory Uniform Resource Indicator (URI), which means it coordinates the establishment of a conference and will supply the actual conference URI to the user once it has been generated. Conference factory responds by sending the conference focus URI (the conference bridge/instance) to the participant that sent the SIP invite, who then instructs each participant to transition their session onto that conference bridge. For more information see Request for Comments (RFC) 4353.

At step 450, the first, second and third devices 110-1, 110-2, 110-3 transition to the infrastructure supported conference communication session in which the first, second and third devices 110-1, 110-2, 110-3 begin to communicate with one another via the conference server 210 over the conference bridge that was assigned for that communication session.

When the transition is complete, the devices 110-1, 110-2, 110-3 communicate CISs to the conference server 210, and as indicated at step 455, the conference server 210 mixes the CISs from the first device 110-1, the second device 110-2, and the third device 110-3 into CCISs, and at step 460, transmits a unique instance of the CCIS to each of the first device 110-1, the second device 110-2, and the third device 110-3. Operation of the conference server 210 and the conference bridge that is instantiated thereat for the infrastructure supported conference communication session takes place in the conventional manner and will not be described in detail here.

When each of the devices participating in the conference communication session determine that resources being utilized are with optimal operating parameters (and/or that metrics associated with each device are within optimal operating parameters), the method 400 proceeds to step 470. At step 470, the initiating device 110-1 automatically continues the ad hoc conference communication session. In this regard, the initiating device 110-1 mixes (or continues to mix) CISs from the first device 110-1, the second device 110-2, and the third device 110-3 into CCISs and retransmits a unique instance of the CCIS to each of the other devices 110-2, 110-3, at step 480.

At step 490, the initiating device 110-1 can determine on a regular basis whether this communication session should continue. If not, then the method 400 ends at step 495. Otherwise, so long as the communication session is continuing, via the loop back to step 420, the initiating device 110-1 checks to determine whether additional devices (not shown) of other participants are to be added to the ad hoc conference communication session. If not, the method 400 loops back to step 420 until a new device of another participant is to be added. each time an additional device (not shown) of another participant is to be added to the existing ad hoc conference communication session, method 400 repeats step 430 and thus determines whether one or more resources being utilized by the initiating device 110-1 to support the existing ad hoc communication session are above a threshold (or thresholds), and the other steps of method 400 then repeat as described above.

It should be appreciated that the exemplary embodiments described with reference to FIG. 4 are not limiting and that other variations exist. It should understood that various changes can be made without departing from the scope of the invention as set forth in the appended claims and the legal equivalents thereof. For example, although step 430 of FIG. 4 provides some examples of metrics and/or resources that can be used when deciding whether or not to transition from the ad hoc conference communication session to an infrastructure supported conference communication session, it should be appreciated that in other implementations, other factors could also be considered at step 430 in making this decision. For instance, when the device of a new participant to be added to the ad hoc conference communication session can only support dissimilar CODECs, then one of the participating devices can initiate a transition to the infrastructure supported conference communication session when the use of that CODEC creates too much CPU demand on the initiating device that is performing the mixing, or when the initiating device that is performing the mixing does not support the new CODEC of the device of the new participant to be added. Alternatively, if user profiles of the device of the new participant to be added indicate that certain services need to be available during the conference communication session that are not available at the participating devices, then one of the participating devices can initiate a transition to the infrastructure supported conference communication session so that mixing can be performed at a conference server.

Those of skill will appreciate that the various illustrative logical blocks, modules, circuits, and steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. As used herein the term "module" refers to a device, a circuit, an electrical component, and/or a software based component for performing a task. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the connecting lines or arrows shown in the various figures contained herein are intended to represent example functional relationships and/or couplings between the various elements. Many alternative or additional functional relationships or couplings may be present in a practical embodiment.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
   initiating an ad hoc communication session between a first device of a first participant and a second device of a second participant;
   deciding, at an initiating device of an initiating participant, to add a third device of a third participant to the communication session to establish an ad hoc conference communication session between the first, second and third participants, and wherein the initiating participant is either the first participant or the second participant that decides to add a third device of a third participant to the communication session, wherein the initiating participant locally mixes communication information streams (CISs) from the other participants in the ad hoc communication session to generate a plurality of conferenced communication information stream (CCISs), and wherein the initiating participant generates a unique CCIS for each of the other participants to receive, where each participant's unique CCIS includes CISs from all other participants but does not include their own CIS; and
   communicating each unique conferenced communication information stream (CCIS) to each of the other participants in the ad hoc communication session by the initiating participant;
   determining, at any of the first, second and third devices, resources required to support the ad hoc conference communication session, and whether one or more of resources are outside optimal operating parameters; and
   when one or more of resources or quality metrics are outside optimal operating parameters, initiating, by any of the devices, a transition from the ad hoc conference communication session to an infrastructure supported conference communication session hosted at a conference server, and then transitioning the first, second and third devices from the ad hoc conference communication session to the infrastructure supported conference communication session in which the first, second and third devices, communicate with one another via the conference server;
   mixing the communication information streams (CISs) from all of the devices in the infrastructure supported communication session b the conference server to generate a plurality of conferenced communication information stream (CCISs), wherein the mixing generates a unique CCIS for each participant to receive where each participant's unique CCIS includes CISs from all other participants, but does not include their own CIS;
   and communicating each unique conferenced communication information stream (CCIS) to each one of all the devices by the conference server,
   wherein the resources being utilized to support the ad hoc conference communication session by the initiating device comprise:
   resources required to perform local mixing in the initiating device of communication information streams (CISs) generated by the first device, the second device and the third device and to generate the plurality of unique conferenced communication information streams (CCISs) to the other devices.

2. A method according to claim 1, wherein transitioning includes beginning the infrastructure supported conference communication session at the conference server and ending the ad hoc conference communication session when one or more of resources or quality metrics are outside optimal operating parameters.

3. A method according to claim 1, further comprising:
   establishing, at the initiating device, that one or more additional devices of other participants are to be added to the ad hoc conference communication session; and
   repeating the determining step each time an additional device of another participant is added to the ad hoc conference communication session.

4. A system, comprising:
   a first device of a first participant, the first device operable to initiate an ad hoc communication session;
   a second device of a second participant operable for participating in ~ the ad hoc communication session with the first device; and
   a third device of a third participant that is operable to be added to the ad hoc communication session to establish the ad hoc conference communication session between the first, second and third participants,
   wherein the first device, second device and third device each comprise:
   a processor designed to determine, based on resources required to support the ad hoc conference communication session, whether one or more resources are outside optimal operating parameters, and wherein the processor of the initiating participant locally mixes communication information streams (CISs) from the other participants in the ad hoc communication session to generate a plurality of conferenced communication information stream (CCISs), and wherein the initiating participant generates a unique CCIS for each of the other participants to receive, where each participant's unique CCIS includes CISs from all other participants but does not include their own CIS, and wherein the processor of the initiating participant communicates each unique conferenced communication information stream (CCIS) to each of the other participants in the ad hoc communication session, and
   wherein the processor of any device is further designed to initiate a transition from the ad hoc conference communication session to an infrastructure supported conference communication session hosted at a conference server when the one or more of the resources are outside optimal operating parameters; and
   a conference server operable to communicate with the first, second and third devices such that the conference server can mix the communication information streams (CISs) from all of the devices in the infrastructure supported communication session to generate a plurality of conferenced communication information stream (CCISs), wherein the mixing generates a unique CCIS for each participant to receive where each participant's unique CCIS includes CISs from all other participants, but does not include their own CIS; and wherein the conference server can communicate each unique conferenced communication information stream (CCIS) to each one of all the devices, wherein the processors of the first device, second device and third device are further designed to determine, based on resources required to support the ad hoc conference communication session, whether one or more resources are outside optimal operating parameters each time a new device of another participant is added to the ad hoc conference communication session, and to initiate a transition from the ad hoc conference communication session to the infrastructure supported conference communication session hosted at the conference server whenever the one or more of the resources are outside optimal operating parameters.

5. A system according to claim 4, wherein the resources being utilized to support the ad hoc conference communication session comprise resources in the initiating device required to perform local mixing of communication information streams (CISs) generated by the first device, the second device and the third device and to generate the plurality of conferenced communication information stream (CCISs).

6. A first device of a first participant, the first device comprising:

a first communication interface that initiates and supports an ad hoc communication session with a second device of a second participant;

a second communication interface that supports communications with a third device when the first, initiating participant decides to add the third device to the ad hoc communication session between the first, second and third participants; and a processor designed to:

evaluate one or more resources required to support the ad hoc conference communication session; and determine whether one or more resources are outside optimal operating parameters, and locally mix communication information streams (CISs) from the other participants in the ad hoc communication session to generate a plurality of conferenced communication information stream (CCISs), and generate a unique CCIS for each of the other participants to receive, where each participant's unique CCIS includes CISs from all other participants but does not include their own CIS, and communicates each unique conferenced communication information stream (CCIS) to each of the other participants in the ad hoc communication session; and when one or more of the resources are outside optimal operating parameters, initiate a transition from the ad hoc conference communication session to an infrastructure supported conference communication session hosted at a conference server by generating a Session Initiation Protocol (SIP) invite request for a Serving-Call Session Control Function (S-CSCF) to request a conference focus Uniform Resource Identifier (URI) for establishment of the infrastructure supported conference communication session, and such that the conference server can mix the communication information streams (CISs) from all of the devices in the infrastructure supported communication session to generate a plurality of conferenced communication information stream (CCISs), wherein the mixing generates a unique CCIS for each participant to receive where each participant's unique CCIS includes CISs from all other participants, but does not include their own CIS; and wherein the conference server can communicate each unique conferenced communication information stream (CCIS) to each one of all the devices, wherein the resources comprise resources required in the processor to perform local mixing of communication information streams (CISs) generated by the first, second and third devices and to generate the plurality of conferenced communication information stream (CCISs).

* * * * *

UNITED STATES PATENT AND TRADEMARK OFFICE
CERTIFICATE OF CORRECTION

PATENT NO.        : 8,243,629 B2                                  Page 1 of 1
APPLICATION NO.   : 12/506697
DATED             : August 14, 2012
INVENTOR(S)       : Stephen et al.

It is certified that error appears in the above-identified patent and that said Letters Patent is hereby corrected as shown below:

In Fig. 4, Sheet 5 of 5, for Tag "410", in Line 1, delete "COMMUNITCATION" and insert -- COMMUNICATION --, therefor.

In Column 1, Line 51, delete "sot" and insert -- so --, therefor.

In Column 11, Line 16, delete "added. each" and insert -- added. Each --, therefor.

In Column 11, Line 26, delete "should" and insert -- should be --, therefor.

In Column 13, Line 64, in Claim 1, delete "b" and insert -- by --, therefor.

Signed and Sealed this
Eighth Day of January, 2013

David J. Kappos
*Director of the United States Patent and Trademark Office*